US009745869B2

(12) United States Patent
Ernst et al.

(10) Patent No.: US 9,745,869 B2
(45) Date of Patent: *Aug. 29, 2017

(54) SYSTEM AND METHOD FOR REGULATING EGR COOLING USING A RANKINE CYCLE

(71) Applicant: Cummins Intellectual Property, Inc., Minneapolis, MN (US)

(72) Inventors: Timothy C. Ernst, Columbus, IN (US); Dave Morris, Columbus, IN (US)

(73) Assignee: Cummins Intellectual Property, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/939,565

(22) Filed: Nov. 12, 2015

(65) Prior Publication Data

US 2016/0061059 A1   Mar. 3, 2016

Related U.S. Application Data

(63) Continuation of application No. 13/336,945, filed on Dec. 23, 2011, now Pat. No. 9,217,338.

(Continued)

(51) Int. Cl.
*F01K 21/06* (2006.01)
*F01K 23/06* (2006.01)
*F02M 25/07* (2006.01)

(52) U.S. Cl.
CPC ....... *F01K 23/065* (2013.01); *F02M 25/0735* (2013.01); *F02M 25/0737* (2013.01); *Y02T 10/16* (2013.01); *Y02T 10/166* (2013.01)

(58) Field of Classification Search
CPC ........ F01K 23/065; F01K 23/06; F01K 23/08; F01K 23/10; F02G 5/02; F02G 5/04;
(Continued)

(56) References Cited

U.S. PATENT DOCUMENTS

| 3,232,052 A | 2/1966 | Ricard |
| 3,789,804 A | 2/1974 | Aguet |

(Continued)

FOREIGN PATENT DOCUMENTS

| EP | 1 273 785 | 1/2003 |
| EP | 2 098 696 | 9/2009 |

(Continued)

OTHER PUBLICATIONS

Office Action for German Patent App. No. 11 2011 104 516.6 dated Aug. 1, 2016.

(Continued)

*Primary Examiner* — Phutthiwat Wongwian
*Assistant Examiner* — Jason T Newton
(74) *Attorney, Agent, or Firm* — Foley & Lardner LLP (57) ABSTRACT

This disclosure relates to a waste heat recovery (WHR) system and method for regulating exhaust gas recirculation (EGR) cooling, and more particularly, to a Rankine cycle WHR system and method, including a recuperator bypass arrangement to regulate EGR exhaust gas cooling for engine efficiency improvement and thermal management. This disclosure describes other unique bypass arrangements for increased flexibility in the ability to regulate EGR exhaust gas cooling.

21 Claims, 8 Drawing Sheets

Related U.S. Application Data (60) Provisional application No. 61/426,972, filed on Dec. 23, 2010.

(58) Field of Classification Search
CPC ..... F01N 5/02; F02C 1/06; F02C 3/34; Y02T 10/166; Y02T 10/16
USPC ......... 60/616, 618, 39.182, 39.52, 645, 653, 60/661, 677, 772; 123/568.12, 568.2; 73/114.74
See application file for complete search history.

(56) References Cited

U.S. PATENT DOCUMENTS

| | | |
|---|---|---|
| 4,009,587 A | 3/1977 | Robinson et al. |
| 4,164,850 A | 8/1979 | Lowi, Jr. |
| 4,232,522 A | 11/1980 | Steiger |
| 4,267,692 A | 5/1981 | Earnest |
| 4,271,664 A | 6/1981 | Earnest |
| 4,428,190 A | 1/1984 | Bronicki |
| 4,458,493 A | 7/1984 | Amir et al. |
| 4,581,897 A | 4/1986 | Sankrithi |
| 4,630,572 A | 12/1986 | Evans |
| 4,831,817 A | 5/1989 | Linhardt |
| 4,873,829 A | 10/1989 | Williamson |
| 4,911,110 A | 3/1990 | Isoda et al. |
| 5,121,607 A | 6/1992 | George, Jr. |
| 5,207,188 A | 5/1993 | Hama et al. |
| 5,421,157 A | 6/1995 | Rosenblatt |
| 5,649,513 A | 7/1997 | Kanda |
| 5,771,868 A | 6/1998 | Khair |
| 5,806,322 A | 9/1998 | Cakmakci et al. |
| 5,915,472 A | 6/1999 | Takikawa et al. |
| 5,950,425 A | 9/1999 | Takahashi et al. |
| 6,014,856 A | 1/2000 | Bronicki et al. |
| 6,035,643 A | 3/2000 | Rosenblatt |
| 6,055,959 A | 5/2000 | Taue |
| 6,138,649 A | 10/2000 | Khair et al. |
| 6,301,890 B1 | 10/2001 | Zeretzke |
| 6,321,697 B1 | 11/2001 | Matsuda et al. |
| 6,324,849 B1 | 12/2001 | Togawa et al. |
| 6,393,840 B1 | 5/2002 | Hay |
| 6,494,045 B2 | 12/2002 | Rollins, III |
| 6,523,349 B2 | 2/2003 | Viteri |
| 6,571,548 B1 | 6/2003 | Bronicki et al. |
| 6,598,397 B2 | 7/2003 | Hanna et al. |
| 6,606,848 B1 | 8/2003 | Rollins, III |
| 6,637,207 B2 | 10/2003 | Konezciny et al. |
| 6,701,712 B2 | 3/2004 | Bronicki et al. |
| 6,715,296 B2 | 4/2004 | Bakran et al. |
| 6,745,574 B1 | 6/2004 | Dettmer |
| 6,748,934 B2 | 6/2004 | Natkin et al. |
| 6,751,959 B1 | 6/2004 | McClanahan et al. |
| 6,792,756 B2 | 9/2004 | Bakran et al. |
| 6,810,668 B2 | 11/2004 | Nagatani et al. |
| 6,817,185 B2 | 11/2004 | Coney et al. |
| 6,848,259 B2 | 2/2005 | Kelller-Sornig et al. |
| 6,877,323 B2 | 4/2005 | Dewis |
| 6,880,344 B2 * | 4/2005 | Radcliff ................ F01K 23/08 60/39.181 |
| 6,910,333 B2 | 6/2005 | Minemi et al. |
| 6,964,168 B1 | 11/2005 | Pierson et al. |
| 6,977,983 B2 | 12/2005 | Correia et al. |
| 6,986,251 B2 | 1/2006 | Radcliff et al. |
| 7,007,487 B2 | 3/2006 | Belokon et al. |
| 7,028,463 B2 | 4/2006 | Hammond et al. |
| 7,044,210 B2 | 5/2006 | Usui |
| 7,069,884 B2 | 7/2006 | Baba et al. |
| 7,117,827 B1 | 10/2006 | Hinderks |
| 7,121,906 B2 | 10/2006 | Sundel |
| 7,131,259 B2 | 11/2006 | Rollins, III |
| 7,131,290 B2 | 11/2006 | Taniguchi et al. |
| 7,159,400 B2 | 1/2007 | Tsutsui et al. |
| 7,174,716 B2 | 2/2007 | Brasz et al. |
| 7,174,732 B2 | 2/2007 | Taniguchi et al. |
| 7,191,740 B2 | 3/2007 | Baba et al. |
| 7,200,996 B2 | 4/2007 | Cogswell et al. |
| 7,225,621 B2 | 6/2007 | Zimron et al. |
| 7,281,530 B2 | 10/2007 | Usui |
| 7,325,401 B1 | 2/2008 | Kesseli et al. |
| 7,340,897 B2 | 3/2008 | Zimron et al. |
| 7,454,911 B2 | 11/2008 | Tafas |
| 7,469,540 B1 | 12/2008 | Knapton et al. |
| 7,578,139 B2 | 8/2009 | Nishikawa et al. |
| 7,665,304 B2 | 2/2010 | Sundel |
| 7,721,552 B2 | 5/2010 | Hansson et al. |
| 7,797,940 B2 | 9/2010 | Kaplan |
| 7,823,381 B2 | 11/2010 | Misselhorn |
| 7,833,433 B2 | 11/2010 | Singh et al. |
| 7,866,157 B2 * | 1/2011 | Ernst ................ F01K 23/065 60/615 |
| 7,942,001 B2 | 5/2011 | Radcliff et al. |
| 7,958,873 B2 * | 6/2011 | Ernst ................ F02G 5/02 123/568.12 |
| 7,997,076 B2 | 8/2011 | Ernst |
| 8,683,801 B2 * | 4/2014 | Ernst ................ F01K 13/02 60/615 |
| 8,826,662 B2 * | 9/2014 | Ernst ................ F01N 5/02 60/618 |
| 8,893,495 B2 * | 11/2014 | Dane ................ F01K 23/065 60/273 |
| 2002/0099476 A1 | 7/2002 | Hamrin et al. |
| 2003/0033812 A1 | 2/2003 | Gerdes et al. |
| 2003/0213245 A1 | 11/2003 | Yates et al. |
| 2003/0213246 A1 | 11/2003 | Coll et al. |
| 2003/0213248 A1 | 11/2003 | Osborne et al. |
| 2004/0255587 A1 * | 12/2004 | Radcliff ................ F01K 23/065 60/671 |
| 2005/0262842 A1 | 12/2005 | Claassen et al. |
| 2008/0041046 A1 * | 2/2008 | Bering ................ F01N 5/02 60/320 |
| 2008/0092539 A1 | 4/2008 | Marshall et al. |
| 2008/0289313 A1 | 11/2008 | Batscha et al. |
| 2009/0031724 A1 | 2/2009 | Ruiz |
| 2009/0090109 A1 | 4/2009 | Mills et al. |
| 2009/0121495 A1 | 5/2009 | Mills |
| 2009/0133646 A1 | 5/2009 | Wankhede et al. |
| 2009/0151356 A1 | 6/2009 | Ast et al. |
| 2009/0179429 A1 | 7/2009 | Ellis et al. |
| 2009/0211253 A1 | 8/2009 | Radcliff et al. |
| 2009/0241543 A1 | 10/2009 | Ernst |
| 2009/0277173 A1 | 11/2009 | Ernst et al. |
| 2009/0320477 A1 | 12/2009 | Juchymenko |
| 2009/0322089 A1 | 12/2009 | Mills et al. |
| 2010/0018207 A1 | 1/2010 | Juchymenko |
| 2010/0071368 A1 | 3/2010 | Kaplan et al. |
| 2010/0083919 A1 | 4/2010 | Bucknell |
| 2010/0139626 A1 | 6/2010 | Raab et al. |
| 2010/0180584 A1 | 7/2010 | Berger et al. |
| 2010/0192569 A1 | 8/2010 | Ambros et al. |
| 2010/0229525 A1 | 9/2010 | MacKay et al. |
| 2010/0257858 A1 | 10/2010 | Yaguchi et al. |
| 2010/0263380 A1 | 10/2010 | Biederman et al. |
| 2010/0282221 A1 | 11/2010 | Le Lievre |
| 2010/0288571 A1 | 11/2010 | Dewis et al. |
| 2011/0005477 A1 | 1/2011 | Terashima et al. |
| 2011/0006523 A1 | 1/2011 | Samuel |
| 2011/0072818 A1 * | 3/2011 | Cook ................ F01K 13/02 60/645 |
| 2011/0094485 A1 | 4/2011 | Vuk et al. |
| 2011/0132243 A1 | 6/2011 | Terushita et al. |
| 2011/0209473 A1 | 9/2011 | Fritz et al. |
| 2012/0023946 A1 | 2/2012 | Ernst et al. |
| 2014/0165558 A1 * | 6/2014 | Birgler ................ F02B 47/08 60/605.1 |

FOREIGN PATENT DOCUMENTS

| | | |
|---|---|---|
| JP | 60-222511 | 11/1985 |
| JP | 08-068318 | 3/1996 |
| JP | 09-032653 | 2/1997 |
| JP | 10-238418 | 9/1998 |
| JP | 11-166453 | 6/1999 |

(56) References Cited

FOREIGN PATENT DOCUMENTS

| | | |
|---|---|---|
| JP | 2005-042618 | 2/2005 |
| JP | 2005-201067 | 7/2005 |
| JP | 2005-329843 | 12/2005 |
| JP | 2008-240613 | 10/2008 |
| JP | 2009-167995 | 7/2009 |
| JP | 2009-191647 | 8/2009 |
| JP | 2010-077964 | 4/2010 |
| WO | WO-2006/138459 | 12/2006 |
| WO | WO-2009/098471 | 8/2009 |

OTHER PUBLICATIONS

The International Search Report and Written Opinion of the International Searching Authority issued in PCT/US2011/067265, dated Apr. 17, 2012.

* cited by examiner

SYSTEM AND METHOD FOR REGULATING EGR COOLING USING A RANKINE CYCLE

CROSS-REFERENCE TO RELATED APPLICATIONS

This application is a continuation of U.S. patent application Ser. No. 13/336,945, filed on Dec. 23, 2011, which claims the benefit of priority to U.S. Provisional Patent Application No. 61/426,972, filed on Dec. 23, 2010, the contents of which are hereby incorporated by reference in their entirety.

RESEARCH OR DEVELOPMENT

This invention was made with government support under "Exhaust Energy Recovery," contract number DE-FC26-05NT42419 awarded by the Department of Energy (DOE). The government has certain rights in the invention.

TECHNICAL FIELD

This disclosure relates to a waste heat recovery (WHR) system and method for regulating exhaust gas recirculation (EGR) cooling, and more particularly, to a Rankine cycle WHR system and method, including a heat exchanger bypass arrangement to regulate EGR cooling for engine efficiency improvement and thermal management.

BACKGROUND

Increasing the efficiency of internal combustion engines is critical to meet customer expectations and an array of government-mandated regulations. Internal combustion engines generate significant amounts of heat that heat exchangers eventually transfer to the air surrounding the internal combustion engine. If a portion of the wasted heat were recovered by performing a necessary engine function, the efficiency of the internal combustion engine would be improved. However, the recovery of this wasted heat can lead to conflict between the needs of two different portions of an internal combustion engine. The resolution of this conflict can lead to improved engine performance and efficiency.

SUMMARY

This disclosure provides a waste heat recovery system for an internal combustion engine. The waste heat recovery system comprises a fluid management circuit and a waste heat recovery circuit. The fluid management circuit includes a sub-cooler containing a liquid working fluid and a pump fluidly connected to the sub-cooler. The pump is operable to draw the liquid working fluid from the sub-cooler. The liquid working fluid has a first temperature. The waste heat recovery circuit includes a recuperator receiving the liquid working fluid from the pump and receiving a vaporized working fluid, wherein a transfer of heat from the vaporized working fluid to the liquid working fluid increases the temperature of the liquid working fluid. The waste heat recovery circuit also includes an EGR boiler flow control valve fluidly connected in parallel to the recuperator and receiving the liquid working fluid from the pump. The waste heat recovery circuit also includes a boiler receiving an EGR exhaust gas at a first inlet, the liquid working fluid at the first temperature from the EGR boiler flow control valve at a second inlet, and the liquid working fluid flowing from the recuperator at a third inlet. The liquid working fluid at the third inlet is at a second temperature. Heat is transferred from the EGR exhaust gas to the liquid working fluid to cause the liquid working fluid to vaporize. The liquid working fluid at the first temperature is used to control the amount of cooling provided to the EGR exhaust gas.

This disclosure also provides a waste heat recovery system for an internal combustion engine. The waste heat recovery system comprises a sub-cooler containing a liquid working fluid and a pump fluidly connected to the sub-cooler and operable to draw the liquid working fluid from the sub-cooler. The liquid working fluid has a first temperature. The waste heat recovery system also comprises a recuperator receiving the liquid working fluid from the pump and receiving vaporized working fluid from an EGR boiler, wherein the temperature of the liquid working fluid is increased by a transfer of heat from the vaporized working fluid to the liquid working fluid. The waste heat recovery system also comprises a heat exchanger fluidly connected to the recuperator, a first EGR boiler flow control valve fluidly connected to the pump in parallel to the recuperator and a second EGR boiler flow control valve fluidly connected to the recuperator and to the EGR boiler. The EGR boiler receives an EGR exhaust gas at a first inlet, the liquid working fluid at the first temperature flowing through the first EGR boiler flow control valve at a second inlet, the liquid working fluid flowing through the recuperator and the second boiler flow control valve at a third inlet, the liquid working fluid flowing through the recuperator and the heat exchanger at a fourth inlet. The liquid working fluid at the third inlet is at a second temperature higher than the first temperature and the liquid working fluid at the fourth inlet is at a third temperature higher than the second temperature. Heat is transferred from the EGR exhaust gas to the liquid working fluid to cause the liquid working fluid to vaporize. The liquid working fluid at the first temperature and the liquid working fluid at the second temperature are used to control the amount of cooling provided to the EGR exhaust gas.

This disclosure also provides a method for regulating EGR exhaust gas temperature in an engine using a Rankine cycle. The method comprises directing a first portion of a liquid working fluid pumped from s sub-cooler through at least one heat exchanger and then to an EGR boiler. The method also comprises directing a second portion of a liquid working fluid pumped from a sub-cooler through a bypass around the at least one heat exchanger to the EGR boiler. The EGR boiler receives the EGR exhaust gas.

Advantages and features of the embodiments of this disclosure will become more apparent from the following detailed description of exemplary embodiments when viewed in conjunction with the accompanying drawings.

DETAILED DESCRIPTION

Figure 1:
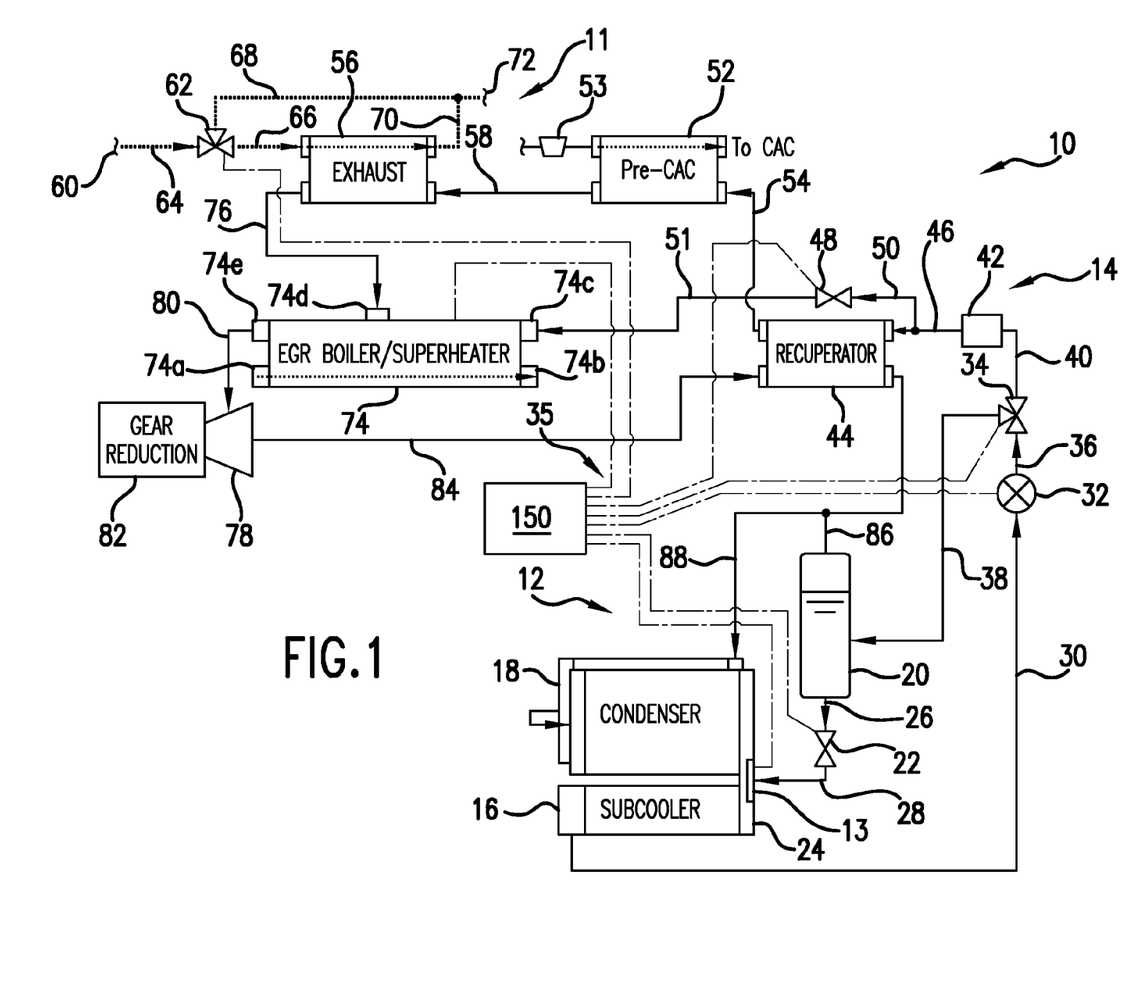
FIG. 1 is a schematic of a first exemplary embodiment of the present disclosure.

Referring now to FIG. 1, an engine system 10 in accordance with a first exemplary embodiment of the present disclosure is shown. Engine system 10 includes a fluid management circuit 12, a portion of an exhaust circuit 11, and elements that are part of a waste heat recovery system or circuit 14.

Fluid management circuit 12 includes a sub-cooler 16, a condenser 18, a receiver 20, and a level control valve 22. Condenser 18 may be integral with sub-cooler 16 or may be commonly mounted on a common base 24, which may include a plurality of fluid flow paths (not shown) to fluidly connect condenser 18 to sub-cooler 16. Receiver 20 may be physically elevated higher than sub-cooler 16 and is connected to sub-cooler 16 through level control valve 22, which connects to receiver 20 by a receiver conduit 26 and to sub-cooler 16 by a sub-cooler conduit 28. Sub-cooler conduit 28 may connect directly to sub-cooler 16 or may connect indirectly to sub-cooler 16 by way of common base 24. Sub-cooler 16 connects to a feed pump 32 by way of a pump conduit 30. Feed pump 32 connects to a feed pump flow valve 34 by way of a feed valve conduit 36. Feed pump flow valve 34 connects to receiver 20 by way of a dump conduit 38 and connects to a filter drier 42 by way of a filter drier conduit 40.

Filter drier 42 connects to a recuperator 44 of waste heat recovery circuit 14 by way of a recuperator conduit 46 and connects to an EGR boiler flow control valve 48 by way of a first boiler control valve conduit 50. EGR boiler control valve 48 connects to an inlet 74c of an EGR boiler/superheater 74 by way of a second boiler control valve conduit 51. Recuperator 44 connects to a pre-charge air cooler (pre-CAC) 52 by way of a pre-CAC conduit 54. Pre-CAC 52 connects to an exhaust heat exchanger 56 by way of an exhaust conduit 58. Exhaust heat exchanger 56 is also part of exhaust circuit 11.

Exhaust circuit 11 may include an aftertreatment system 60 that connects to an exhaust gas control valve 62 by way of an aftertreatment conduit 64. Exhaust gas control valve 62 connects to exhaust heat exchanger 56 by way of a first exhaust gas conduit 66. Exhaust gas control valve 62 also connects to a tailpipe or exhaust pipe 72 by way of a second exhaust gas conduit 68. Exhaust heat exchanger 56 also connects to tailpipe or exhaust pipe 72 by way of a third exhaust conduit 70. Exhaust gas heat exchanger 56 connects to an inlet 74d of EGR boiler/superheater 74 of waste heat recovery circuit 14 by way of an EGR conduit 76. EGR boiler/superheater 74 is also an EGR cooler. EGR boiler/superheater 74 has an EGR inlet 74a and an EGR outlet 74b.

EGR boiler/superheater 74 connects to an energy conversion device 78 by way of a first conversion device conduit 80, which is connected to an outlet 74e of EGR boiler/superheater 74. Energy conversion device 78 of Rankine cycle WHR system 10 is capable of producing additional work or transferring energy to another device or system. For example, energy conversion device 78 can be a turbine that rotates as a result of expanding working fluid vapor to provide additional work, which can be fed into the engine's driveline to supplement the engine's power either mechanically or electrically (e.g., by turning a generator), or it can be used to power electrical devices, parasitic or a storage battery (not shown). Alternatively, the energy conversion device can be used to transfer energy from one system to another system (e.g., to transfer heat energy from WHR system 10 to a fluid for a heating system).

Energy conversion device 78 may drive an auxiliary unit 82. Auxiliary unit 82 may be part of a generator. If auxiliary unit 82 is a generator, it may feed a motor generator that may be part of a hybrid drive system. Energy conversion device 78 connects to recuperator 44 by way of a second conversion device conduit 84. Recuperator 44 connects to condenser 18 of fluid management circuit 12 by a condenser conduit 88. Recuperator 44 connects to receiver 20 by way of condenser conduit 88 and a receiver vent conduit 86.

Engine system 10 includes a control module or control system 150. Control module 150, which may be a single processor, a distributed processor, an electronic equivalent of a processor, or any combination of the aforementioned elements, as well as software, electronic storage, fixed lookup tables and the like, is connected to certain components of fluid management circuit 12 and waste heat recovery circuit 14 by a wire harness 35, though such connection may be by other means, including a wireless system.

Figure 5A:
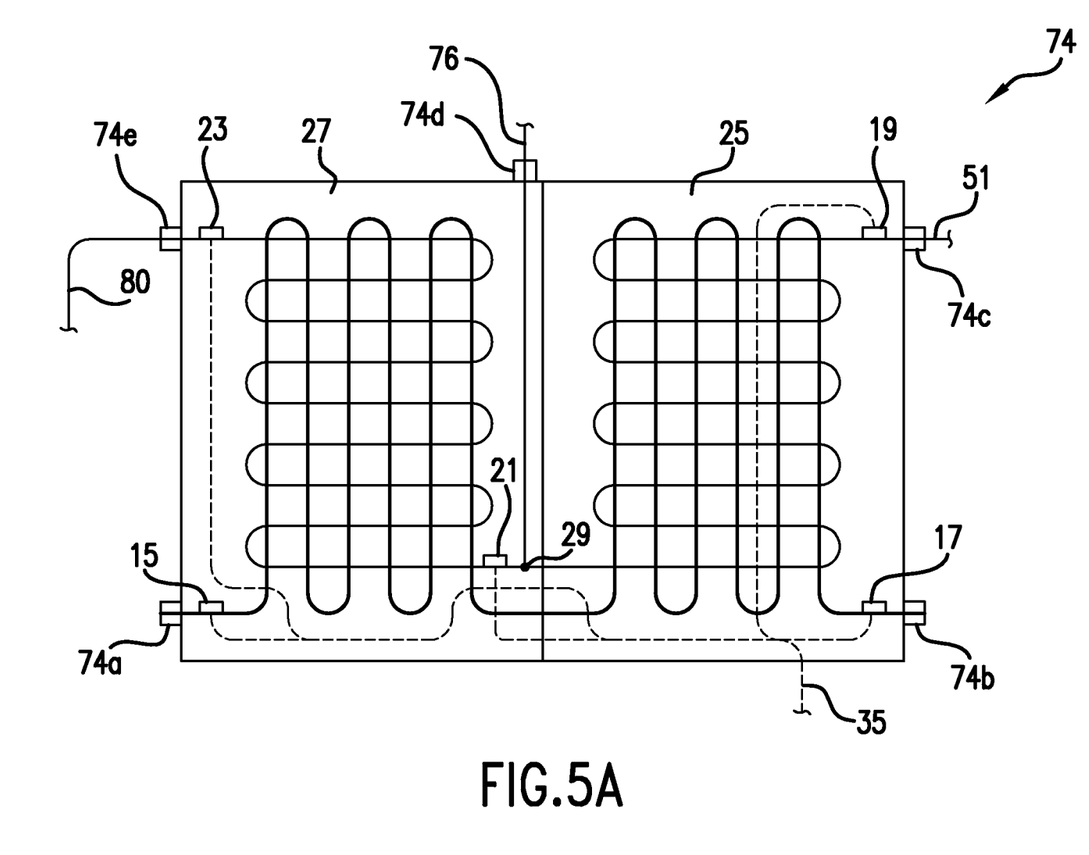
FIG. 5A is a schematic of a first exemplary embodiment heat exchanger of the present disclosure.

Control module 150 connects to a fluid level sensor 13 associated with sub-cooler 16. Control module 150 connects to feed pump flow valve 34, EGR boiler flow control valve 48, and exhaust gas control valve 62. Control module 150 may connect to feed pump 32. Control module 150 may also connect to temperature sensors positioned within EGR boiler/superheater 74. Referring to FIG. 5A, control module 150 may connect to a first EGR temperature sensor 15, a second EGR temperature sensor 17, a first working fluid temperature sensor 19, a second working fluid temperature sensor 21, and a third working fluid temperature sensor 23. Temperature sensor 17 and temperature sensor 19 may be located in a lower temperature portion 25 of EGR boiler/superheater 74. Temperature sensor 15, temperature sensor 21 and temperature sensor 23 may be located in a higher temperature portion 27 of EGR boiler/superheater 74.

Sub-cooler 16 stores liquid working fluid. If the level of liquid working fluid in sub-cooler 16 is less than a predetermined level as determined by a working fluid level sensor 13, level control valve 22 opens. Liquid working fluid from receiver 20 will then flow through receiver conduit 26, level control valve 22, and then sub-cooler conduit 28 to enter either sub-cooler 16 or base plate 24 and then sub-cooler 16, which are fluidly downstream of receiver 20.

An engine system 10 belt (not shown) or an electric motor (not shown) drives feed pump 32. Feed pump 32 pulls or draws liquid working fluid from sub-cooler 16 through pump conduit 30. Feed pump 32 then forces liquid working fluid through feed valve conduit 36 to feed pump flow valve 34. Feed pump flow valve 34 has two functions. Control module or control system 150 of engine system 10 monitors the cooling function of waste heat recovery circuit 14. If waste heat recovery circuit 14 requires additional liquid working fluid, control module or control system 150 of engine system 10 directs proportional feed pump flow valve 34 of fluid management system 12 to provide additional liquid working fluid to waste heat recovery circuit 14 through filter drier conduit 40. Proportional feed pump flow valve 34 directs any liquid working fluid not required by waste heat recovery circuit 14 to receiver 20 by way of dump conduit 38.

Filter drier conduit 40 connects liquid working fluid to filter drier 42. The function of filter drier 42 is to trap moisture, particulates and other contaminants that might interfere with or cause damage to the operation of waste heat recovery circuit 14. In an existing Rankine cycle configuration, the liquid working fluid flows downstream from filter drier 42 through recuperator conduit 46 to recuperator 44. Heat transfers from the hot vaporized working fluid returning to condenser 18 from energy conversion device 78 by way of second conversion device conduit 84 and recuperator 44 to the cooler liquid working fluid entering recuperator 44 by way of recuperator conduit 46. As will be seen, the cooler liquid working fluid coming into recuperator 44 by way of recuperator conduit 46 may need to be heated to a level sufficient to perform useful work in EGR boiler/superheater 74, and recuperator 44 may provide a first step in the heating process. While helping to heat the liquid working fluid coming into recuperator 44 by way of recuperator conduit 46, vaporized working fluid entering recuperator 44 by way of second conversion device conduit 84 is cooled prior to entering condenser 18.

From recuperator 44, liquid working fluid now travels downstream to pre-CAC 52 by way of pre-CAC conduit 54. Pre-CAC 52 receives air from an engine system 10 turbocharger compressor 53. The air from turbocharger compressor 53 is heated by action of turbocharger compressor 53. Pre-CAC 52 transfers some of the heat from that compressed air to the liquid working fluid entering pre-CAC 52 by way of pre-CAC conduit 54. Similar to the function of recuperator 44, pre-CAC 52 serves to raise the temperature level of the liquid working fluid entering pre-CAC 52 while cooling the air entering pre-CAC 52. Charge air exiting pre-CAC 52 travels to a charge air cooler (not shown). The charge air cooler further reduces the temperature of charge air before that air enters the cylinders (not shown) of engine system 10.

Liquid working fluid exiting pre-CAC 52 travels downstream through exhaust conduit 58 to exhaust heat exchanger 56. Exhaust heat exchanger 56 receives some or all exhaust gas from an upstream aftertreatment system 60, which is directed to exhaust heat exchanger 56 by aftertreatment conduit 64, proportional exhaust gas control valve 62 and first exhaust gas conduit 66. Exhaust gas control valve 62 directs hot exhaust gas through exhaust heat exchanger 56 based on the temperature of exhaust heat exchanger 56. Temperature sensors may be located in exhaust gas heat exchanger 56, EGR boiler/superheater 74 or other locations to determine whether exhaust gas heat exchanger 56 is at an appropriate temperature to raise the temperature of the liquid working fluid received from exhaust conduit 58 prior to exiting exhaust gas heat exchanger 56 by way of downstream EGR conduit 76. Exhaust gas traveling through exhaust heat exchanger 56 travels downstream by way of third exhaust gas conduit 70 to tailpipe or exhaust pipe 72. To prevent exhaust gas heat exchanger 56 from overheating, exhaust gas control valve 62 can limit the heat load on exhaust gas heat exchanger 56 by diverting some or all exhaust gas around exhaust heat exchanger 56 downstream through second exhaust gas conduit 68 to tailpipe or exhaust pipe 72.

The temperature of the liquid working fluid has been raised three times, first by receiving heat from hot vaporized working fluid in recuperator 44, second by receiving heat from the turbocharger compressor in pre-CAC 52, which is downstream of recuperator 44, and third by receiving heat from exhaust gases in exhaust gas heat exchanger 56, which is downstream of pre-CAC 52. The liquid working fluid now travels downstream to inlet 74d of EGR boiler/superheater 74 by way of EGR conduit 76. Exhaust gases exiting the exhaust manifold (not shown) of engine system 10 that are part of an exhaust gas recirculating (EGR) system enter EGR boiler/superheater 74 at EGR inlet 74a. Exhaust gas from the EGR system flows through EGR boiler/superheater 74, which may take the place of an EGR cooler. The exhaust gas is cooled in EGR boiler/superheater 74 while transferring heat to the liquid working fluid, causing the liquid working fluid, which has been pre-warmed as previously described, to boil and to produce a high-pressure vapor or gas that exits EGR boiler/superheater 74 at EGR outlet 74e. The vaporized working fluid then travels downstream via first conversion device conduit 80 to energy conversion device 78. For simplicity, EGR boiler/superheater 74 may be called EGR boiler 74 or boiler 74 hereinafter. The exhaust gas exits EGR boiler/superheater 74 at EGR outlet 74b to return to the EGR system.

High-pressure energy conversion device 78 may drive auxiliary device 82. Auxiliary device 82 can channel mechanical energy into the driveline (not shown) of engine system 10 or can generate electrical energy to power electrical devices or for storage in one or more batteries. If auxiliary device 82 is an electrical generator, the power could power a driveline motor generator (not shown) by way of power electronics (not shown) to help drive a vehicle (not shown) in which engine system 10 is mounted.

The vaporized or gaseous working fluid flows downstream through second conversion device conduit 84 to recuperator 44. As previously noted, the gaseous working fluid entering recuperator 44 from second conversion conduit 84 is relatively hot compared to the liquid working fluid entering recuperator 44 from upstream recuperator conduit 46. Because recuperator 44 acts as a heat exchanger, heat is transferred from the gaseous working fluid to the liquid working fluid entering recuperator 44 from upstream recuperator conduit 46. The gaseous working fluid next flows downstream through condenser conduit 88 to condenser 18. Condenser 18 has cooling air or fluid flowing through it to cool the gaseous working fluid, returning the gaseous working fluid to a liquid state. The working fluid, now returned to a liquid state, flows downstream through fluid passages that may be in base plate 24 to return to sub-cooler 16. Note that receiver 20 vents by way of receiver vent conduit 86 to condenser conduit 88, permitting the level of liquid working fluid in receiver 20 to raise and lower as needed.

The system described thus far is a Rankine cycle waste heat recovery system or an organic Rankine cycle if the working fluid is an organic high molecular mass fluid with a liquid-vapor phase change that is lower than the water-steam phase change. Examples of Rankine cycle working fluids, organic and inorganic, include Genetron® R-245fa from Honeywell, Therminol®, Dowtherm J™ from Dow Chemical Co., Fluorinol® from American Nickeloid, toluene, dodecane, isododecane, methylundecane, neopentane, neopentane, octane, water/methanol mixtures, or steam. While the system described above may be a Rankine cycle or an organic Rankine cycle, it also presents an opportunity with respect to the exhaust gas recirculation (EGR) system.

Current EGR systems are passive devices without the ability to regulate EGR cooler output temperature actively. The present disclosure describes a configuration that provides an ability to regulate EGR outlet temperature by using a partial bypass of recuperator 44 while still maintaining Rankine cycle efficiency and the improved fuel economy yielded by EGR. As previously noted, recuperator 44 provides a heat exchange between gaseous working fluid entering recuperator 44 from upstream second conversion device conduit 84 and liquid working fluid entering recuperator 44 from upstream recuperator conduit 46. The liquid working fluid then travels downstream to pre-CAC 52, then to exhaust heat exchanger 56 and then to EGR boiler/superheater 74, thus gaining the benefits of interfacing with these components. However, a portion of the liquid working fluid bypasses recuperator 44 in a parallel path by way of first boiler control valve conduit 50, EGR boiler flow control valve 48, and second boiler control valve conduit 51. EGR boiler flow control valve 48 may be a proportional valve that permits a portion of the liquid working fluid to bypass recuperator 44. Alternatively, EGR boiler flow control valve 48 may be modulated to open and close to adjust the amount of liquid working fluid entering second boiler control valve conduit 51.

The liquid working fluid that bypasses recuperator 44 connects downstream to inlet 74c of EGR boiler/superheater 74 by way of second boiler control valve conduit 51. The liquid working fluid that enters EGR boiler/superheater 74 by way of valve conduit 51 goes to low-temperature section 25 of the EGR boiler/superheater 74, which is also an EGR exhaust gas cooler, to regulate, control or adjust the temperature of the exhaust gas that exits EGR boiler/superheater 74 at EGR outlet 74b. This regulation is possible because the liquid working fluid entering inlet 74c is at a much lower temperature than the liquid working fluid entering EGR boiler/superheater 74 from EGR conduit 76. The liquid working fluid entering EGR boiler/superheater 74 at EGR inlet 74c may be at a much lower temperature than the exhaust gas entering EGR inlet 74a. Thus, by adjusting the amount of liquid working fluid that enters EGR boiler/superheater 74 by way of second boiler control valve conduit 51, engine system 10 and waste heat recovery circuit 14 have the capability to regulate, control or adjust the temperature of EGR exhaust gas that enters EGR inlet 74a and exits EGR outlet 74b. The capability of regulating the temperature of EGR exhaust gas is accomplished by changing the flow rate of the coolest liquid working fluid within EGR boiler/superheater 74. The benefit to the ability to adjust the temperature of the EGR exhaust gas is that increased cooling of EGR exhaust gas when the engine is hot increases the efficiency of the engine and generally leads to lower emissions of NOx from the engine. However, excessive cooling may lead to undesirable condensation, so temperature monitoring within EGR boiler/superheater 74 is important to maintain the temperature of EGR exhaust gas within a functionally useful range. Decreasing cooling of EGR exhaust gas increases engine temperature, which is beneficial when the engine is cold so that the engine reaches an optimal operating temperature more quickly. Decreasing cooling of EGR exhaust gas is also beneficial for thermal management of the aftertreatment system, which includes regeneration of certain elements of the aftertreatment system.

Control module 150 may regulate the function of boiler 74. Control module 150 does this by receiving signals from various temperature sensors and then controlling various valves located in engine system 10. For example, some situations may require additional heat to cause the liquid working fluid to boil, which control module 150 might determine by receiving a temperature and pressure signal from temperature and pressure sensor 23 located in higher temperature portion 27 of boiler 74. The temperature and pressure signal from sensor 23 may indicate that the superheat of the vaporized working fluid is lower than a target value. Control module 150 may also read the temperature of EGR exhaust gas entering boiler 74 by receiving a temperature signal from first EGR temperature sensor 15 and using that signal to determine whether additional heat needs applied to the liquid working fluid to increase the superheat of the vaporized working fluid. Control module 150 may then command exhaust gas control valve 62 to increase the amount of exhaust gas flow to exhaust heat exchanger 56 to increase the temperature of the liquid working fluid flowing through conduit 76 to boiler 74. Control module 150 may also close EGR boiler flow control valve 48 to increase the flow of liquid working fluid through recuperator 44, pre-CAC 52 and exhaust heat exchanger 56 to increase the amount of heat transferred to the liquid working fluid. Control module 150 may also reduce the flow rate of feed pump 32 or bypass liquid working fluid through feed pump flow valve 34 back to receiver 20, which results in a decreased flow rate through recuperator 44, pre-CAC 52, and exhaust heat exchanger 56, which increases the temperature of the vaporized working fluid at the inlet of energy conversion device 78. Control module 150 may also increase the flow of EGR exhaust gas into inlet 74a of boiler 74 by modulating an EGR valve (not shown).

While vaporization or boiling of the liquid working fluid is an important function of EGR boiler/superheater 74, EGR boiler/superheater 74 also functions as an EGR cooler. The configuration of boiler 74 allows boiler 74 to boil or vaporize the liquid working fluid while continuing to provide cooling of the EGR exhaust gas. Second EGR temperature sensor 17 may indicate inadequate cooling of EGR exhaust gas as it prepares to exit outlet 74b of boiler 74. Control module 150 may actuate EGR boiler flow control valve 48 upstream of inlet 74c to increase the amount of relatively cool liquid working fluid entering inlet 74c of boiler 74 into lower temperature portion 25 of boiler 74. The relatively low temperature of the liquid working fluid provides additional cooling of EGR exhaust gas prior to the EGR exhaust gas returning to the EGR system. Liquid working fluid flows through boiler portion 25 into higher temperature boiler portion 27, joining with liquid working fluid that enters boiler 74 from inlet 74d at junction 29. The higher temperature of the liquid working fluid entering inlet 74d in combination with the temperature of the EGR exhaust gas acts to quickly convert the liquid working fluid into a vapor, which proceeds through outlet 74e to conduit 80 and then downstream to energy conversion device 78. Thus, the configuration of boiler 74 permits EGR boiler 74 to provide cooling to EGR exhaust gas while converting liquid working fluid to a vapor. This same process may also adjust the superheat of the vaporized working fluid by decreasing the temperature and pressure of the vaporized working fluid by taking one or more of the actions described hereinabove.

Figure 2:
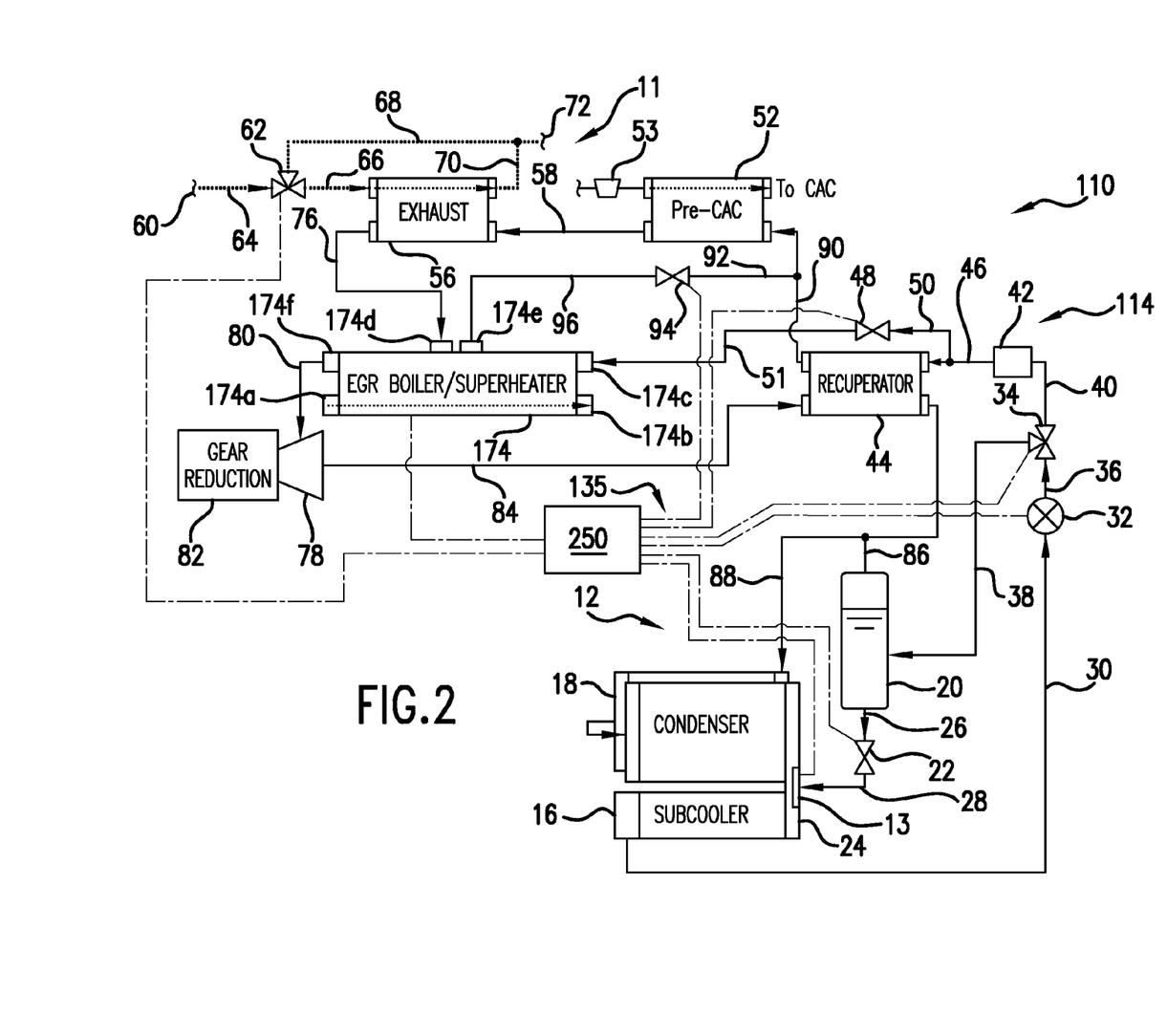
FIG. 2 is a schematic of a second exemplary embodiment of the present disclosure.

Referring now to FIG. 2, an engine system 110 in accordance with a second exemplary embodiment of the present disclosure is shown. Engine system 110 includes a waste heat recovery circuit 114, fluid management circuit 12, and a portion of exhaust circuit 11. Elements in this embodiment having the same number as the first embodiment work as described in the first embodiment and are discussed again only as necessary for clarity.

In this embodiment, second boiler control valve conduit 51 connects to an inlet 174c of an EGR boiler 174. Recuperator 44 connects to downstream pre-CAC 52 by a pre-CAC conduit 90. Connected to and extending downstream from pre-CAC conduit 90 is a third boiler valve conduit 92. A second EGR boiler flow control valve 94 may connect to third boiler valve conduit 92. A fourth boiler valve conduit 96 connects second EGR boiler flow control valve 94 to a downstream inlet 174e of EGR boiler 174. Pre-CAC 52 connects downstream to exhaust heat exchanger 56 as described in the previous embodiment, and exhaust circuit 11 is as described in the previous embodiment. Exhaust heat exchanger 56 connects to a downstream inlet 174d of EGR boiler 174 by way of EGR conduit 76. EGR boiler 174 also includes an EGR inlet 174*a* and an EGR outlet 174*b*.

Engine system 110 includes a control module or control system 250. Control module 250, which may be a single processor, a distributed processor, an electronic equivalent of a processor, or any combination of the aforementioned elements, as well as software, electronic storage, fixed lookup tables and the like, is connected to certain components of fluid management circuit 12 and waste heat recovery circuit 114 by a wire harness 135, though such connection may be by other means, such as a wireless system.

Figure 5B:
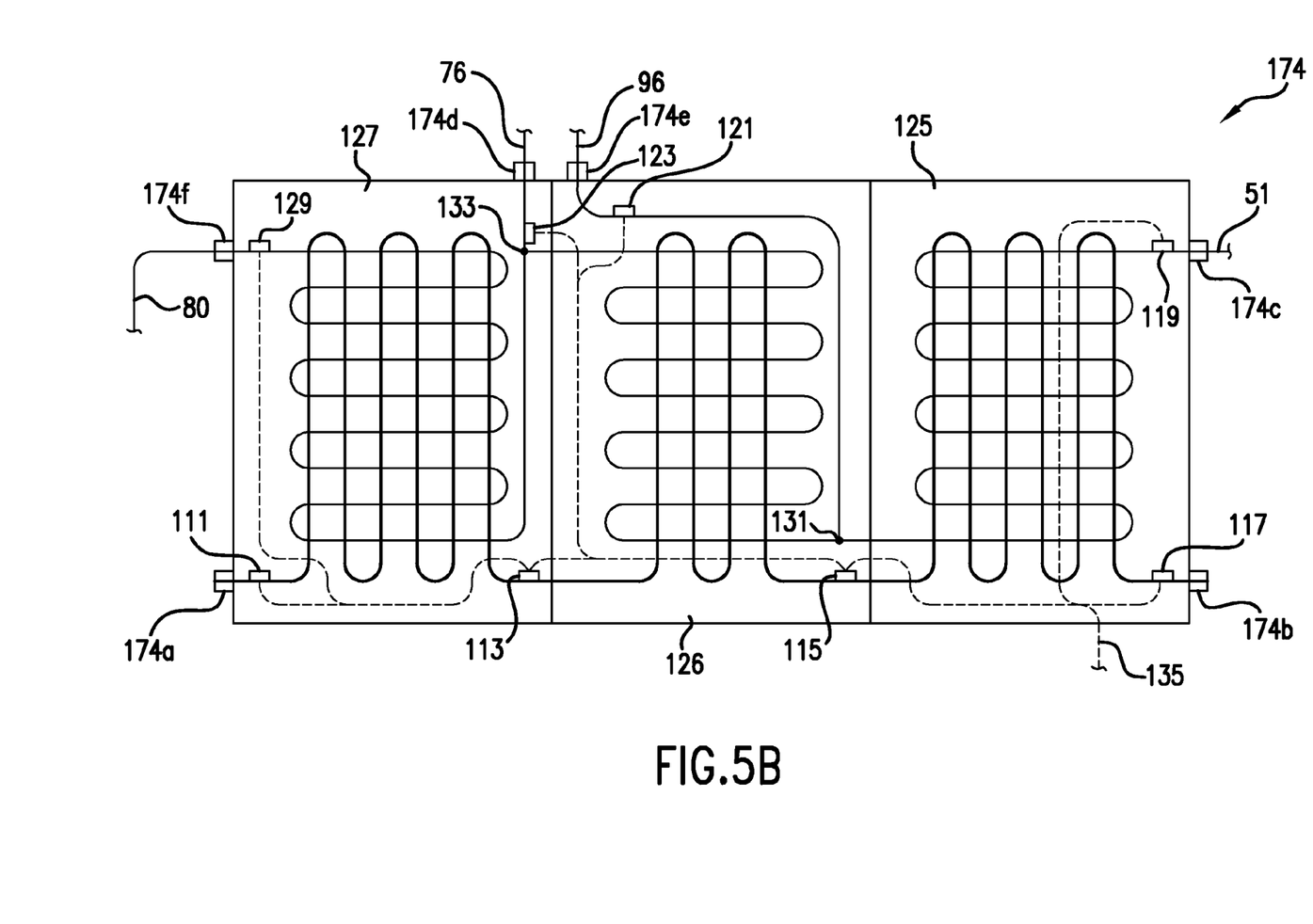
FIG. 5B is a schematic of a second exemplary embodiment heat exchanger of the present disclosure.

Control module 250 connects to fluid level sensor 13 associated with sub-cooler 16. Control module 250 connects to feed pump flow valve 34, EGR boiler flow control valve 48, exhaust gas control valve 62, and second EGR boiler flow control valve 94. Control module 250 may connect to feed pump 32. Control module 250 may also connect to temperature sensors positioned within EGR boiler/superheater 174 or in other locations. Referring to FIG. 5B, control module 250 may connect to a first EGR temperature sensor 111, a second EGR temperature sensor 113, a third EGR temperature sensor 115, a fourth EGR temperature sensor 117, a first working fluid temperature sensor 119, a second working fluid temperature sensor 121, and a third working fluid temperature sensor 123 and a temperature and pressure sensor 129. Temperature sensor 117 and temperature sensor 119 may be located in a lower temperature portion 125 of EGR boiler/superheater 174. Temperature sensor 115 and temperature sensor 121 may be located in a moderate temperature portion 126 of EGR boiler/superheater 174. Temperature sensor 111, temperature sensor 113, temperature sensor 123, and temperature and pressure sensor 129 may be located in a higher temperature portion 127 of EGR boiler/superheater 174.

The second embodiment is similar in many respects to the first embodiment, with one key difference. In addition to the liquid working fluid that bypasses recuperator 44 and connects downstream to inlet 174*c* of EGR boiler/superheater 174 by way of second boiler control valve conduit 51, and the liquid working fluid that enters inlet 174*d*, liquid working fluid also enters a third inlet 174*e*. The liquid working fluid in pre-CAC conduit 90 has a higher temperature than the temperature of the liquid working fluid in conduit 51, but the temperature of the liquid working fluid in pre-CAC conduit 90 is lower than the temperature of the liquid working fluid in conduit 76.

The benefit to this configuration is that the temperature of the EGR exhaust gas may be adjusted, regulated or cooled with greater precision by having the ability to select from three different liquid working fluid temperatures. The lowest temperature is from second boiler control valve conduit 51, an intermediate temperature is from fourth boiler valve conduit 96, and a relatively high temperature is from EGR conduit 76. Note that all three temperatures might be relatively low in comparison with the EGR exhaust gas entering inlet 174*a*. As with the first embodiment, decreasing cooling of EGR exhaust gas increases engine temperature, which is beneficial when the engine is cold so that the engine reaches an optimal operating temperature more quickly. Decreasing cooling of EGR exhaust gas is also beneficial for thermal management of the aftertreatment system, which includes regeneration of certain elements of the aftertreatment system.

Note also that while this embodiment contains second EGR boiler control valve 94, which may be a proportional valve that is adjustable, EGR boiler control valve 94 may be eliminated in some embodiments and replaced with an aperture having a fixed diameter or by using a reduced diameter conduit to restrict flow to inlet 174*e*. While this configuration has less flexibility than a configuration using an adjustable valve, a fixed amount of liquid working fluid at an intermediate temperature entering the EGR boiler may be beneficial in regulating the temperature limits of the EGR exhaust gas.

Control module 250 may regulate the function of boiler 174. Control module 250 does this by receiving signals from various temperature sensors and then controlling various valves located in engine system 110. For example, some situations may require additional heat to cause the liquid working fluid to boil, which control module 250 might determine by receiving a temperature signal from temperature and pressure sensor 129 located in higher temperature portion 127 of boiler 174. The temperature and pressure signal from sensor 129 may indicate that the superheat is lower than target. Control module 250 may read the temperature of EGR exhaust gas entering boiler 174 by receiving a temperature signal from first EGR temperature sensor 111 and using that signal to determine whether additional heat needs applied to the liquid working fluid. Control module 250 may then command exhaust gas control valve 62 to increase the amount of downstream exhaust gas flow to exhaust heat exchanger 56 to increase the temperature of the liquid working fluid flowing through conduit 76 to boiler 174. Control module 250 may also close EGR boiler flow control valve 48 to increase the flow of liquid working fluid through recuperator 44, pre-CAC 52 and exhaust heat exchanger 56 to increase the amount of heat transferred to the liquid working fluid. Control module 250 may also close EGR boiler flow control valve 94 to increase the flow of liquid working fluid through pre-CAC 52 and exhaust heat exchanger 56 to increase the amount of heat transferred to the liquid working fluid. Control module 250 may also reduce the flow rate of feed pump 32 or bypass liquid working fluid through feed pump flow valve 34 back to receiver 20, which results in a decreased flow rate through recuperator 44, pre-CAC 52, and exhaust heat exchanger 56, which increases heat transferred to the liquid working fluid and increases the temperature of the vaporized working fluid at the inlet of energy conversion device 78. Control module 250 may also increase the flow of EGR exhaust gas into inlet 174*a* of boiler 174 by modulating an EGR valve (not shown).

While vaporization or boiling of the liquid working fluid is an important function of EGR boiler/superheater 174, EGR boiler/superheater 174 also functions as an EGR cooler. The configuration of boiler 174 allows boiler 174 to boil or vaporize the liquid working fluid while continuing to provide cooling of the EGR exhaust gas. Second EGR temperature sensor 115 and third EGR temperature sensor 117 may indicate inadequate cooling of EGR exhaust gas as it travels through moderate temperature section 126 and low temperature section 125 of boiler 174 as the EGR exhaust gas travels through boiler 174 and then prepares to exit outlet 174*b* of boiler 174. Control module 250 may actuate EGR boiler flow control valve 48 to increase the amount of relatively cool liquid working fluid entering inlet 174*c* of boiler 174 into lower temperature portion 125 of boiler 174. The relatively low temperature of the liquid working fluid entering lower temperature portion 125, measured by temperature sensor 119, provides additional cooling of EGR exhaust gas prior to the EGR exhaust gas returning to the EGR system. Liquid working fluid flows through boiler portion 125 into moderate temperature portion 126, joining with liquid working fluid that entered boiler 174 from inlet 174e at junction 131. The temperature of the liquid working fluid entering inlet 174e, measured by temperature sensor 121, provides some cooling of the EGR exhaust gas prior to the EGR exhaust gas traveling to low temperature portion 125. The liquid working fluid continues to gain heat as it travels through moderate temperature portion 126. The liquid working fluid then travels into higher temperature boiler portion 127, joining with liquid working fluid that enters boiler 174 from inlet 174d at junction 133. The higher temperature of the liquid working fluid entering inlet 174d, measured by temperature sensor 123, in combination with the temperature of the EGR exhaust gas acts to quickly convert the liquid working fluid into a vapor, which proceeds through outlet 174f to conduit 80 and then downstream to energy conversion device 78. The various temperature sensors in combination with the various valves of the system regulate the amount of cooling provided to EGR exhaust gas as it travels through the various portions of boiler 174 while regulating the amount of heating provided to the liquid working fluid, thus improving the amount of cooling provided to the EGR exhaust gas while assuring the liquid working fluid vaporizes.

As with the previous embodiment, the superheat of the vaporized working fluid needs to be within a targeted range in order to optimize performance of WHR system 110. Adjusting the opening of the valves described hereinabove and taking the actions described hereinabove adjusts the temperature of the liquid working fluid, which also affects the superheat of the vaporized working fluid. Thus, if superheat needs reduced, heat transfer to the liquid working fluid is reduced, or for a given heat input, the flow rate to the heat exchangers is increased by reducing the amount of feed pump bypass valve 34. If superheat needs increased, heat transfer to the liquid working fluid is increased, or for a given heat input, the flow rate to the heat exchangers is reduced by bypassing increased flow rate at the feed pump bypass valve 34.

Figure 3:
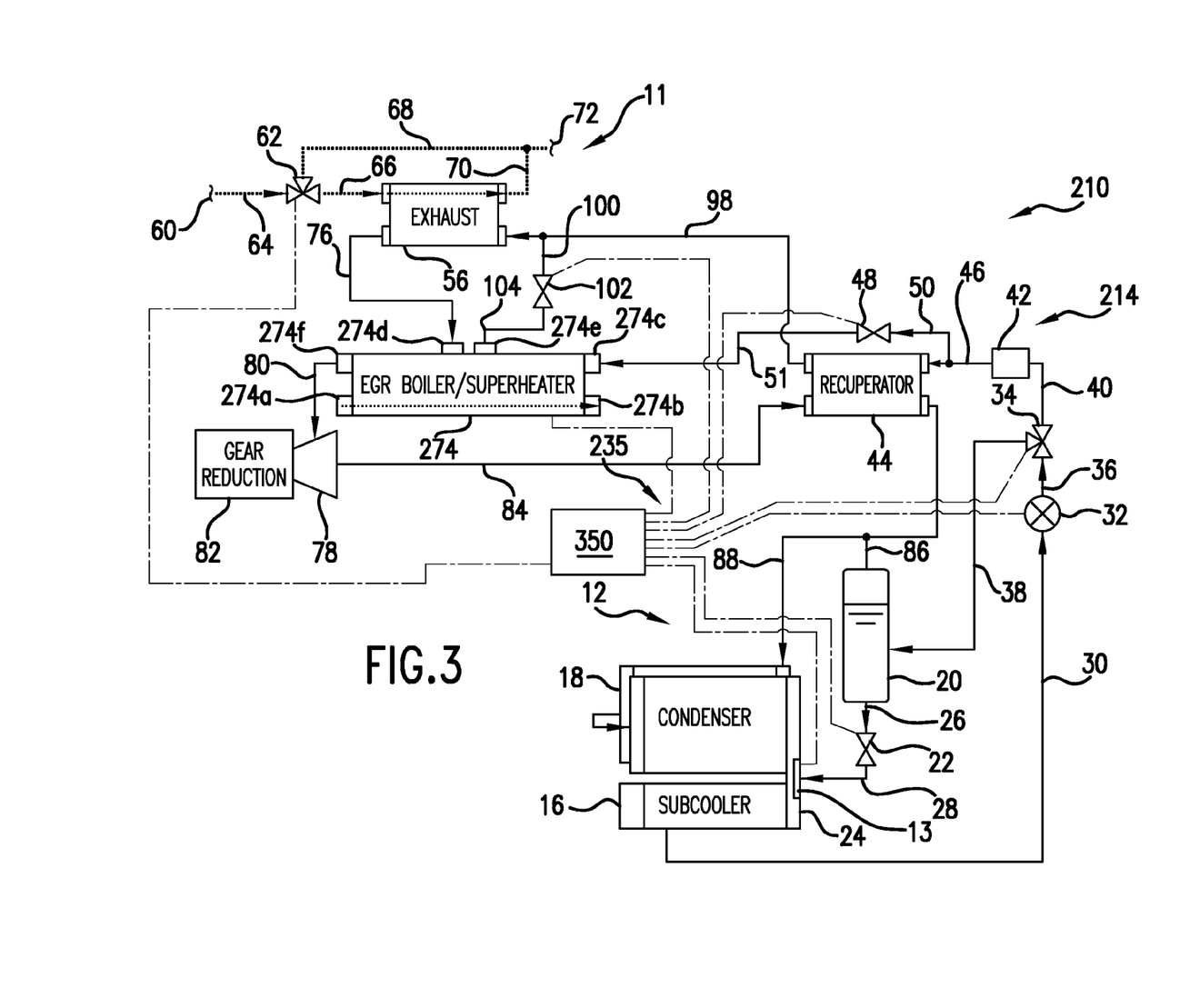
FIG. 3 is a schematic of a third exemplary embodiment of the present disclosure.

Referring now to FIG. 3, an engine system 210 in accordance with a third exemplary embodiment of the present disclosure is shown. An engine system 210 includes a waste heat recovery circuit 214, fluid management circuit 12, and a portion of exhaust circuit 11. Elements in this embodiment having the same number as the first embodiment work as described in the first embodiment and are discussed again only as necessary for clarity.

In this embodiment, second boiler control valve conduit 51 connects to an inlet 274c of an EGR boiler/superheater 274. Recuperator 44 connects downstream to exhaust cooler 56 by an exhaust conduit 98. Connected to and extending downstream from exhaust conduit 98 is a third boiler valve conduit 100. A second EGR boiler flow control valve 102 may connect to third boiler valve conduit 100. A fourth boiler valve conduit 104 connects second EGR boiler flow control valve 102 to a downstream inlet 274e of EGR boiler 274. Heat exchanger 56 is as described in the first exemplary embodiment, and exhaust circuit 11 is as described in the first exemplary embodiment. Exhaust heat exchanger 56 connects to an inlet 274d of EGR boiler 274 by way of EGR conduit 76. EGR boiler 274 also includes an EGR inlet 274a and an EGR outlet 274b.

Engine system 210 includes a control module or control system 350. Control module 350, which may be a single processor, a distributed processor, an electronic equivalent of a processor, or any combination of the aforementioned elements, as well as software, electronic storage, fixed lookup tables and the like, is connected to certain components of fluid management circuit 12 and waste heat recovery circuit 214 by a wire harness 235, though such connection may be by other means, such as a wireless system.

Figure 5C:
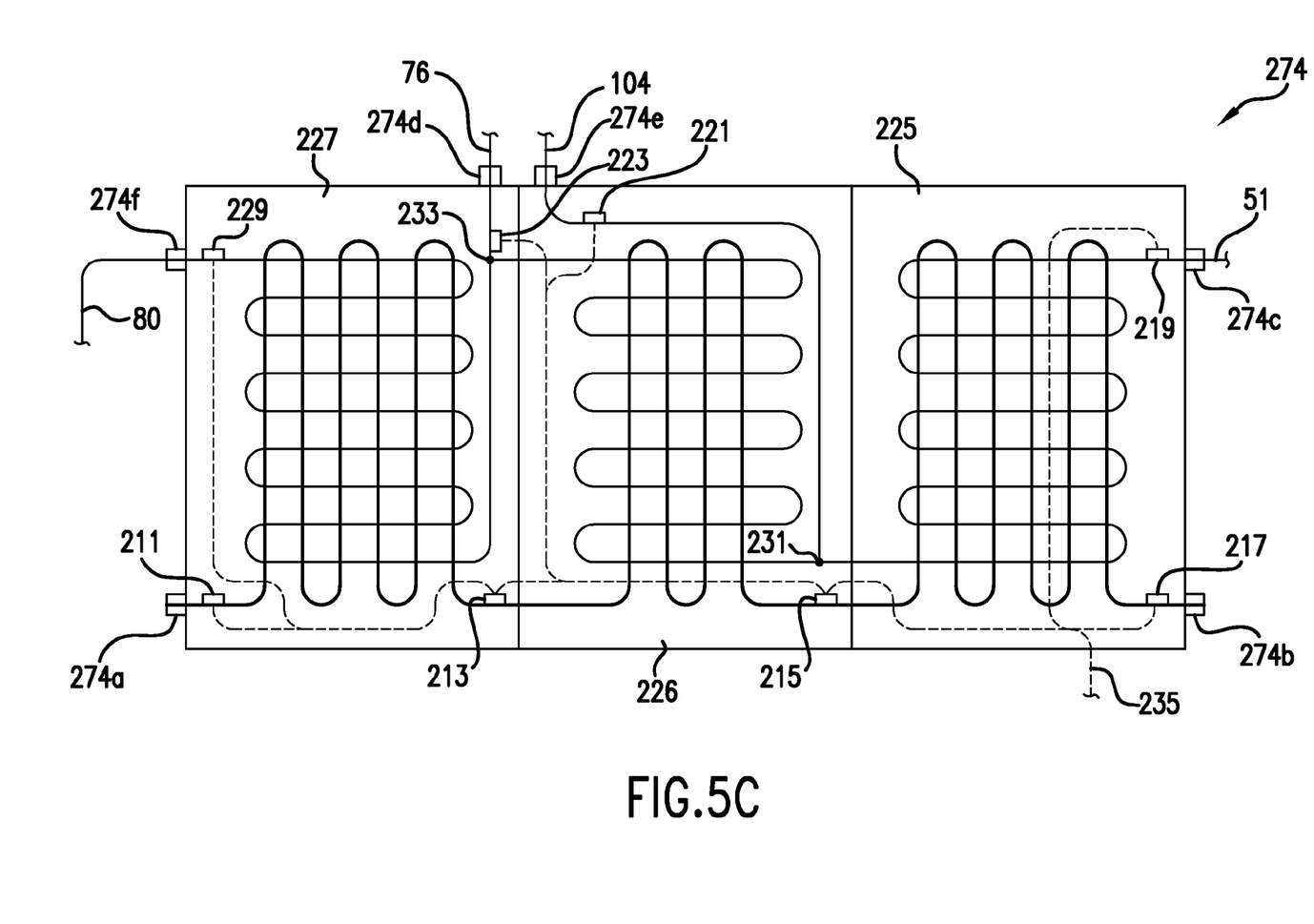
FIG. 5C is a schematic of a third exemplary embodiment heat exchanger of the present disclosure.
Figure 5D:
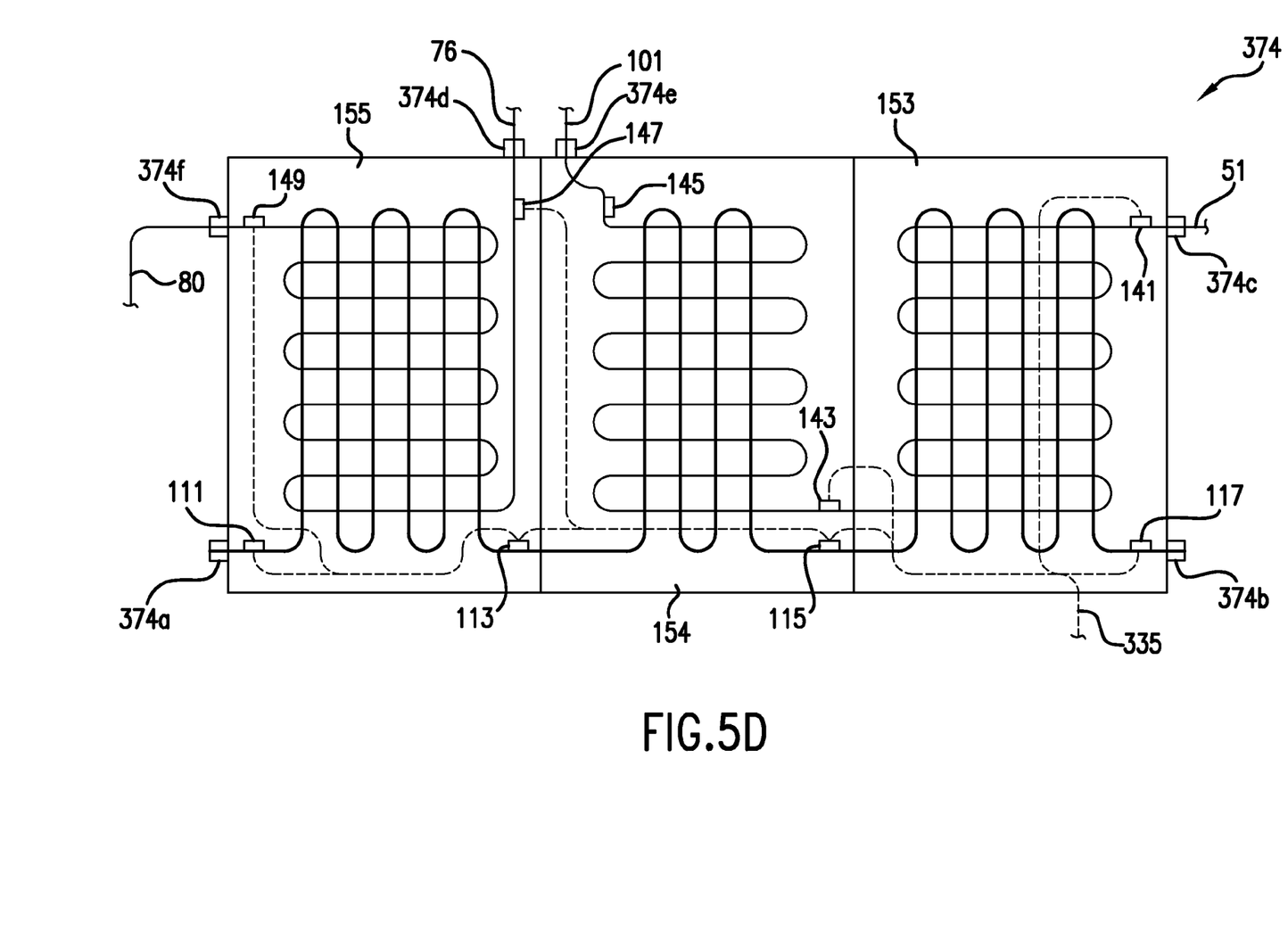
FIG. 5D is a schematic of a fourth exemplary embodiment heat exchanger of the present disclosure.

Control module 350 connects to fluid level sensor 13 associated with sub-cooler 16. Control module 350 connects to feed pump flow valve 34, EGR boiler flow control valve 48 and EGR boiler flow control valve 102. Control module 350 may connect to feed pump 32. Control module 350 may also connect to temperature sensors positioned within EGR boiler/superheater 274 or in other locations. Referring to FIG. 5C, control module 350 may connect to a first EGR temperature sensor 211, a second EGR temperature sensor 213, a third EGR temperature sensor 215, a fourth EGR temperature sensor 217, a first working fluid temperature sensor 219, a second working fluid temperature sensor 221, a third working fluid temperature sensor 223 and a temperature and pressure sensor 229. Temperature sensor 217 and temperature sensor 219 may be located in a lower temperature portion 225 of EGR boiler/superheater 274. Temperature sensor 215 and temperature sensor 221 may be located in a moderate temperature portion 226 of EGR boiler/superheater 274. Temperature sensor 211, temperature sensor 213, temperature sensor 223, and temperature and pressure sensor 229 may be located in a higher temperature portion 227 of EGR boiler/superheater 274.

The third embodiment operates similarly in many respects to the second embodiment, with one key difference. In this embodiment, there is no pre-charge air cooler. However, any heat transfer to the working fluid lost in the elimination of a pre-charge air cooler may be offset by increasing heat transfer in exhaust heat exchanger 56 or in EGR boiler 274, if increased heat transfer is necessary or desirable. As with the second embodiment, in addition to the liquid working fluid that bypasses recuperator 44 and connects downstream to inlet 274c of EGR boiler/superheater 274 by way of second boiler control valve conduit 51 and the liquid working fluid that enters inlet 274d, liquid working fluid also enters a third inlet 274e. The liquid working fluid in fourth boiler valve conduit 104 has a higher temperature than the temperature of the liquid working fluid in conduit 51, but the temperature of the liquid working fluid in fourth boiler valve conduit 104 is lower than the temperature of the liquid working fluid in conduit 76. The benefit to this configuration is that the temperature of the EGR exhaust gas may be adjusted, regulated or cooled with greater precision by having the ability to select from three different liquid working fluid temperatures. The lowest temperature is from second boiler control valve conduit 51, an intermediate temperature is from fourth boiler valve conduit 104, and a relatively high temperature is from EGR conduit 76. Note that all three temperatures might be relatively low in comparison with the temperature of EGR exhaust gas entering inlet 274a. As with the first embodiment, decreasing cooling of EGR exhaust gas increases engine temperature, which is beneficial when the engine is cold so that the engine reaches an optimal operating temperature more quickly. Decreasing cooling of EGR exhaust gas is also beneficial for thermal management of the aftertreatment system, which includes regeneration of certain elements of the aftertreatment system.

Control module 350 may regulate the function of boiler 274. Control module 350 does this by receiving signals from various temperature sensors and then controlling various valves located in engine system 210. For example, some situations may require additional heat to cause the liquid working fluid to boil, which control module 350 might determine by receiving a temperature signal from temperature and pressure sensor 229 located in higher temperature portion 227 of boiler 274. The temperature and pressure signal from sensor 229 may indicate that the superheat is lower than target. Control module may read the temperature of EGR exhaust gas entering boiler 274 by receiving a temperature signal from first EGR temperature sensor 211 and using that signal to determine whether additional heat needs applied to the liquid working fluid. Control module 350 may then command exhaust gas control valve 62 to increase the amount of downstream exhaust gas flow to exhaust heat exchanger 56 to increase the temperature of the liquid working fluid flowing through conduit 76 to boiler 274. Control module 350 may also close EGR boiler flow control valve 48 to increase the flow of liquid working fluid through recuperator 44 and exhaust heat exchanger 56 to increase the amount of heat transferred to the liquid working fluid. Control module 350 may also close EGR boiler flow control valve 102 to increase the flow of liquid working fluid through exhaust heat exchanger 56 to increase the amount of heat transferred to the liquid working fluid. Control module 350 may also reduce the flow rate of feed pump 32 or bypass liquid working fluid through feed pump flow valve 34 back to receiver 20, which results in a decreased flow rate through recuperator 44 and exhaust heat exchanger 56, which increases heat transferred to the liquid working fluid. Control module 350 may also increase the flow of EGR exhaust gas into inlet 274a of boiler 274 by modulating an EGR valve (not shown).

While vaporization or boiling of the liquid working fluid is an important function of EGR boiler/superheater 274, EGR boiler/superheater 274 also functions as an EGR cooler. The configuration of boiler 274 allows boiler 274 to boil or vaporize the liquid working fluid while continuing to provide cooling of the EGR exhaust gas. Second EGR temperature sensor 215 and third EGR temperature sensor 217 may indicate inadequate cooling of EGR exhaust gas as it travels through moderate temperature section 226 and low temperature section 225 of boiler 274 as the EGR exhaust gas travels through boiler 274 and then prepares to exit outlet 274b of boiler 274. Control module 350 may actuate EGR boiler flow control valve 48 to increase the amount of relatively cool liquid working fluid entering inlet 274c of boiler 274 into lower temperature portion 225 of boiler 274. The relatively low temperature of the liquid working fluid entering lower temperature portion 225, measured by temperature sensor 219, provides additional cooling of EGR exhaust gas prior to the EGR exhaust gas returning to the EGR system. Liquid working fluid flows through low temperature portion 225 into moderate temperature portion 226, joining with liquid working fluid that enters boiler 274 from inlet 274e at a junction 231. The temperature of the liquid working fluid entering inlet 274e, measured by temperature sensor 221, provides some cooling of the EGR exhaust gas prior to the EGR exhaust gas traveling to low temperature portion 225. The liquid working fluid continues to gain heat as it travels downstream through moderate temperature portion 226. The liquid working fluid then travels into higher temperature boiler portion 227, joining with liquid working fluid that enters boiler 274 from inlet 274d at junction 233. The higher temperature of the liquid working fluid entering inlet 274d, measured by temperature sensor 223, in combination with the temperature of the EGR exhaust gas entering boiler 274 at inlet 274a, acts to quickly convert the liquid working fluid into a vapor, which proceeds through outlet 274f to conduit 80 and then downstream to energy conversion device 78. The various temperature sensors in combination with the various valves of the system regulate the amount of cooling provided to EGR exhaust gas as it travels through the various portions of boiler 274 while regulating the amount of heating provided to the liquid working fluid, thus improving the amount of cooling provided to the EGR exhaust gas while assuring the liquid working fluid vaporizes.

As with the previous embodiment, the superheat of the vaporized working fluid needs to be within a targeted range in order to optimize performance of WHR system 210. Adjusting the opening of the valves described hereinabove and taking the actions described hereinabove adjusts the temperature of the liquid working fluid, which also affects the superheat of the vaporized working fluid. Thus, if superheat needs reduced, heat transfer to the liquid working fluid is reduced. If superheat needs increased, heat transfer to the liquid working fluid is increased.

Figure 4:
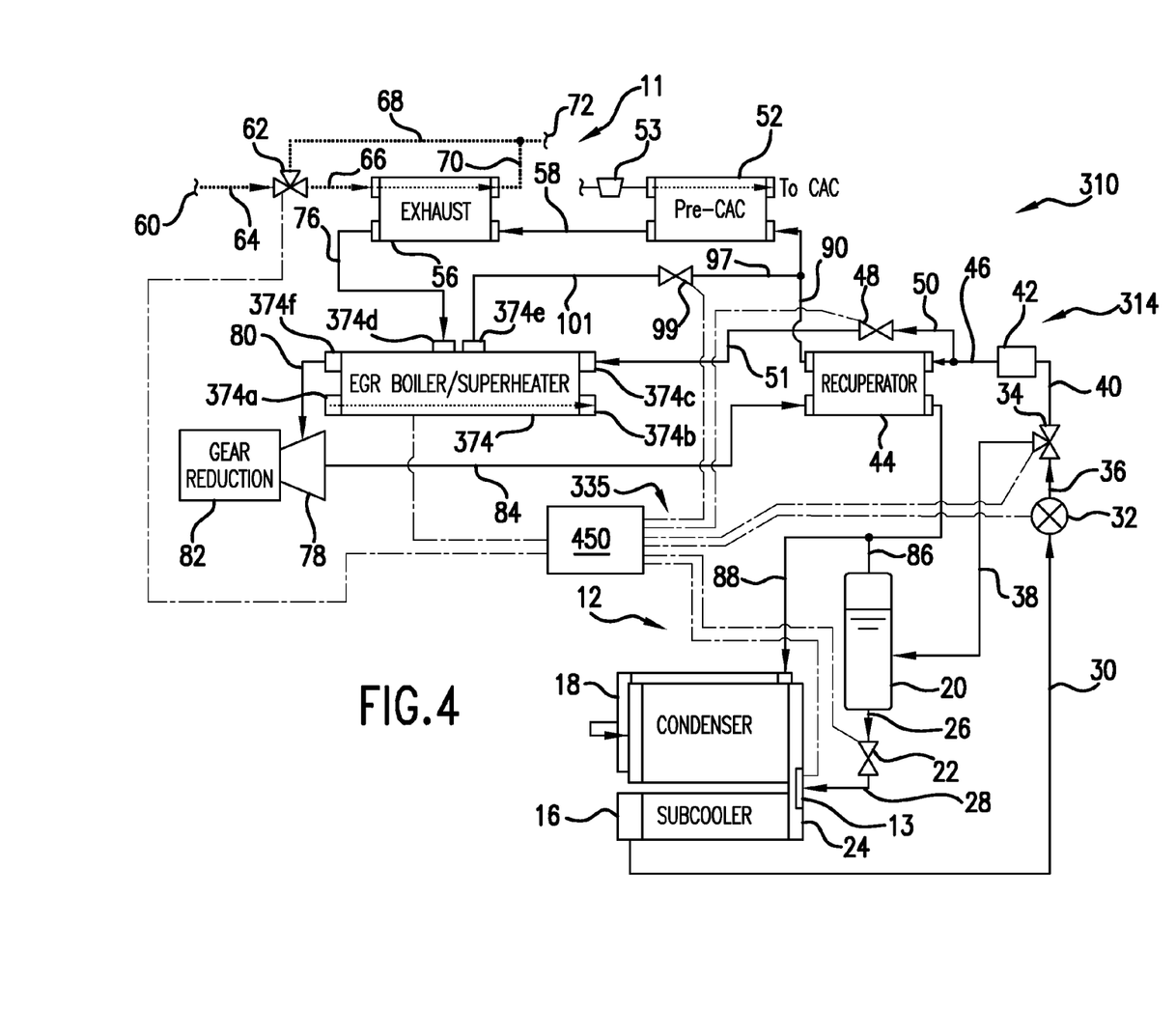
FIG. 4 is a schematic of a fourth exemplary embodiment of the present disclosure

Referring now to FIG. 4, an engine system 310 in accordance with a fourth exemplary embodiment of the present disclosure is shown. Engine system 310 includes a waste heat recovery circuit 314, fluid management circuit 12, and a portion of exhaust circuit 11. Elements in this embodiment having the same number as previous embodiments work as described in the first embodiment and are discussed again only as necessary for clarity.

In this embodiment, second boiler control valve conduit 51 connects to an inlet 374c of an EGR boiler 374. Recuperator 44 connects to downstream pre-CAC 52 by a pre-CAC conduit 90. Connected to and extending upstream from pre-CAC conduit 90 is a third boiler valve conduit 97. A second EGR boiler flow control valve 99 may connect to third boiler valve conduit 97. A fourth boiler valve conduit 101 connects second EGR boiler flow control valve 94 to an upstream outlet 374e of EGR boiler 374. Pre-CAC 52 connects downstream to exhaust heat exchanger 56 as described in the previous embodiment, and exhaust circuit 11 is as described in the first two embodiments. Exhaust heat exchanger 56 connects to a downstream inlet 374d of EGR boiler 374 by way of EGR conduit 76. EGR boiler 374 also includes an EGR inlet 374a and an EGR outlet 374b.

Engine system 310 includes a control module or control system 250. Control module 450, which may be a single processor, a distributed processor, an electronic equivalent of a processor, or any combination of the aforementioned elements, as well as software, electronic storage, fixed lookup tables and the like, is connected to certain components of fluid management circuit 12 and waste heat recovery circuit 314 by a wire harness 335, though such connection may be by other means, such as a wireless system.

Control module 450 connects to fluid level sensor 13 associated with sub-cooler 16. Control module 450 connects to feed pump flow valve 34, EGR boiler flow control valve 48, exhaust gas control valve 62, and second EGR boiler flow control valve 99. Control module 450 may connect to feed pump 32. Control module 450 may also connect to temperature sensors positioned within EGR boiler/superheater 374 or in other locations. Referring to FIG. 5B, control module 450 may connect to a first EGR temperature sensor 111, a second EGR temperature sensor 113, a third EGR temperature sensor 115, a fourth EGR temperature sensor 117, a first working fluid temperature sensor 141, a second working fluid temperature sensor 143, a third working fluid temperature sensor 145, a fourth working fluid temperature sensor 147, and a temperature and pressure sensor 149. Temperature sensor 117 and temperature sensor 141 may be located in a lower temperature portion 153 of EGR boiler/superheater 374. Temperature sensor 115, temperature sensor 143, and temperature sensor 145 may be located in a moderate temperature portion 154 of EGR boiler/superheater 374. Temperature sensor 111, temperature sensor 113, temperature sensor 147, and temperature and pressure sensor 149 may be located in a higher temperature portion 154 of EGR boiler/superheater 374.

The fourth embodiment is similar in many respects to the second embodiment, with one key difference. The liquid working fluid that bypasses recuperator 44 and connects downstream to inlet 374c of EGR boiler/superheater 374 by way of second boiler control valve conduit 51 exits outlet 374e of EGR boiler/superheater 374.

The benefit to this configuration is that the temperature of the EGR exhaust gas may be adjusted, regulated or cooled with greater precision by having the ability to select from two different liquid working fluid temperatures while subjecting the cooler liquid working fluid to additional heat in Pre-CAC 52 and exhaust heat exchanger 56 prior to the liquid working fluid entering high temperature portion 154 of EGR boiler 374. As with the first embodiment, decreasing cooling of EGR exhaust gas increases engine temperature, which is beneficial when the engine is cold so that the engine reaches an optimal operating temperature more quickly. Decreasing cooling of EGR exhaust gas is also beneficial for thermal management of the aftertreatment system, which includes regeneration of certain elements of the aftertreatment system.

Note also that while this embodiment contains second EGR boiler control valve 99, which may be a proportional valve that is adjustable, EGR boiler control valve 99 may be eliminated in some embodiments.

Control module 450 may regulate the function of boiler 374. Control module 450 does this by receiving signals from various temperature sensors and then controlling various valves located in engine system 310. For example, some situations may require additional heat to cause the liquid working fluid to boil, which control module 450 might determine by receiving a temperature signal from temperature and pressure sensor 149 located in higher temperature portion 154 of boiler 374. The temperature and pressure signal from sensor 149 may indicate that the superheat is lower than target. Control module 450 may read the temperature of EGR exhaust gas entering boiler 374 by receiving a temperature signal from first EGR temperature sensor 111 and using that signal to determine whether additional heat needs applied to the liquid working fluid. Control module 450 may then command exhaust gas control valve 62 to increase the amount of downstream exhaust gas flow to exhaust heat exchanger 56 to increase the temperature of the liquid working fluid flowing through conduit 76 to boiler 374. Control module 450 may also close EGR boiler flow control valve 48 to increase the flow of liquid working fluid through recuperator 44, pre-CAC 52 and exhaust heat exchanger 56 to increase the amount of heat transferred to the liquid working fluid. Control module 450 may also adjust the flow through EGR boiler 374 by adjusting EGR boiler flow control valve 99. Control module 450 may also reduce the flow rate of feed pump 32 or bypass liquid working fluid through feed pump flow valve 34 back to receiver 20, which results in a decreased flow rate through recuperator 44, pre-CAC 52, and exhaust heat exchanger 56, which increases heat transferred to the liquid working fluid. Control module 450 may also increase the flow of EGR exhaust gas into inlet 374a of boiler 374 by modulating an EGR valve (not shown).

While vaporization or boiling of the liquid working fluid is an important function of EGR boiler/superheater 374, EGR boiler/superheater 374 also functions as an EGR cooler. The configuration of boiler 374 allows boiler 374 to boil or vaporize the liquid working fluid while improving cooling of the EGR exhaust gas. Second EGR temperature sensor 115 and third EGR temperature sensor 117 may indicate inadequate cooling of EGR exhaust gas as it travels through moderate temperature section 154 and low temperature section 153 of boiler 374 as the EGR exhaust gas travels through boiler 374 and then prepares to exit outlet 374b of boiler 374. Control module 450 may actuate EGR boiler flow control valve 48 to increase the amount of relatively cool liquid working fluid entering inlet 174c of boiler 174 into lower temperature portion 153 of boiler 374. The relatively low temperature of the liquid working fluid entering lower temperature portion 153, measured by temperature sensor 141, provides additional cooling of EGR exhaust gas prior to the EGR exhaust gas returning to the EGR system. Liquid working fluid flows through boiler portion 153 into moderate temperature portion 154, exiting EGR boiler 374 at outlet 374e. The temperature of the liquid working fluid flowing through low temperature portion 153 and moderate temperature portion 154 may be monitored with temperature sensor 143 and temperature sensor 145, which assists control module 450 in determining the additional cooling capability of the liquid working fluid as well as the additional heat that needs transferred to the liquid working fluid to boil. After passing through pre-CAC 52 and exhaust heat exchanger 56, the liquid working fluid enters EGR boiler 374 at inlet 374d. The higher temperature of the liquid working fluid entering inlet 374d, measured by temperature sensor 147, in combination with the temperature of the EGR exhaust gas acts to quickly convert the liquid working fluid into a vapor, which proceeds through outlet 374f to conduit 80 and then downstream to energy conversion device 78. The various temperature sensors in combination with the various valves of the system regulate the amount of cooling provided to EGR exhaust gas as it travels through the various portions of boiler 374 while regulating the amount of heating provided to the liquid working fluid, thus improving the amount of cooling provided to the EGR exhaust gas while assuring the liquid working fluid vaporizes.

As with the previous embodiment, the superheat of the vaporized working fluid needs to be within a targeted range in order to optimize performance of WHR system 310. Adjusting the opening of the valves described hereinabove and taking the actions described hereinabove adjusts the temperature of the liquid working fluid, which also affects the superheat of the vaporized working fluid. Thus, if superheat needs reduced, heat transfer to the liquid working fluid is reduced. If superheat needs increased, heat transfer to the liquid working fluid is increased.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:
1. A system, comprising:
 a sub-cooler including a liquid working fluid;
 a recuperator fluidly coupled to the sub-cooler so as to receive a first portion of the liquid working fluid;
 a first flow control valve fluidly coupled to the sub-cooler in parallel with the recuperator so as to receive a second portion of the liquid working fluid; and
 a boiler, including:

a first inlet fluidly coupled to the recuperator so as to receive the first portion of the liquid working fluid at a first temperature, and a second inlet fluidly coupled to the first flow control valve so as to receive the second portion of the liquid working fluid at a second temperature, the second temperature being lower than the first temperature.

2. The system of claim 1, wherein the first flow control valve is structured to control the amount of fluid flow of the first portion of the liquid working fluid relative to the second portion.

3. The system of claim 2, wherein controlling the amount of fluid flow of the first portion of the liquid working fluid relative to the second portion controls the amount of cooling of exhaust gas flowing through the boiler.

4. The system of claim 3, wherein increasing the fluid flow of the first portion of the liquid working fluid relative to the second fluid decreases the amount of cooling of the exhaust gas.

5. The system of claim 1, further comprising a heat exchanger fluidly coupled to each of the recuperator and the first inlet of the boiler, the heat exchanger positioned downstream of the recuperator and upstream of the boiler.

6. The system of claim 5, further comprising a second flow control valve fluidly coupled to the recuperator in parallel with the heat exchanger so as to receive a third portion of the liquid working fluid from the recuperator at a third temperature, the third temperature being lower than the first temperature and higher than the second temperature.

7. The system of claim 6, wherein the boiler further includes a third inlet fluidly coupled to the second flow control valve so as to receive the third portion of the liquid working fluid at the third temperature.

8. A method, comprising:
pumping a liquid working fluid at a first temperature from a sub-cooler to a first flow control valve; and
operating the first flow control valve so as to:
direct a first portion of the liquid working fluid through a recuperator and into a first inlet of a boiler, the recuperator heating the first portion to a second temperature higher than the first temperature, and
direct a second portion of the liquid working fluid to a second inlet of the boiler, the second portion bypassing the recuperator.

9. The method of claim 8, wherein the first flow control valve is structured to control an amount of fluid flow of the first portion of the liquid working fluid relative to the second portion.

10. The method of claim 9, wherein controlling the amount of fluid flow of the first portion of the liquid working fluid relative to the second portion controls the amount of cooling of exhaust gas flowing through the boiler.

11. The method of claim 10, wherein increasing the fluid flow of the first portion of the liquid working fluid relative to the second portion decreases the amount of cooling of the exhaust gas.

12. The method of claim 8, wherein the first portion of the liquid working fluid is directed through a heat exchanger positioned downstream of the recuperator and upstream of the boiler.

13. The method of claim 12, further comprising operating a second flow control valve fluidly coupled to the recuperator in parallel with the heat exchanger so as to direct a third portion of the liquid working fluid from the recuperator to a third inlet of the boiler, the third portion being at a third temperature lower than the first temperature and higher than the second temperature.

14. A system, comprising:
a fluid management circuit, including:
a sub-cooler containing a liquid working fluid, and
a pump fluidly connected to the sub-cooler and operable to draw the liquid working fluid from the sub-cooler; and
a waste heat recovery circuit, including:
a recuperator fluidly coupled to the pump and configured to receive a first portion of the liquid working fluid from the pump, wherein the first portion of the liquid working fluid exits the recuperator at a first temperature,
a first flow control valve fluidly coupled to the pump in parallel with the recuperator so as to receive a second portion of the liquid working fluid from the pump, the second portion being at a second temperature lower than the first temperature, and
a boiler, including:
a first inlet fluidly coupling the boiler to the recuperator so as to receive the first portion of the liquid working fluid from the recuperator, and
a second inlet fluidly coupled to the first flow control valve so as to receive the second portion of the liquid working fluid.

15. The system of claim 14,
wherein the boiler further includes an exhaust gas inlet fluidly coupled to an exhaust gas circuit so as to receive exhaust gas, and
wherein heat is transferred from the exhaust gas to each of the first and second portions of the liquid working fluid so as to cool the exhaust gas.

16. The system of claim 15, wherein the first flow control valve is structured to control an amount of fluid flow of the first portion of the liquid working fluid relative to the second portion.

17. The system of claim 16, wherein controlling the amount of fluid flow of the first portion of the liquid working fluid relative to the second portion controls the amount of cooling of the exhaust gas flowing through the boiler.

18. The system of claim 17, wherein increasing the fluid flow of the first portion of the liquid working fluid relative to the second portion decreases the amount of cooling of the exhaust gas.

19. The system of claim 14, further comprising a heat exchanger fluidly coupled to each of the recuperator and the first inlet of the boiler, the heat exchanger positioned downstream of the recuperator and upstream of the boiler.

20. The system of claim 19, further comprising a second flow control valve fluidly coupled to the recuperator in parallel with the heat exchanger so as to receive a third portion of the liquid working fluid from the recuperator at a third temperature, the third temperature being lower than the first temperature and higher than the second temperature.

21. The system of claim 20, wherein the boiler further includes a third inlet fluidly coupled to the second flow control valve so as to receive the third portion of the liquid working fluid at the third temperature.

* * * * *